US006460113B1

(12) United States Patent
Schubert et al.

(10) Patent No.: US 6,460,113 B1
(45) Date of Patent: Oct. 1, 2002

(54) SYSTEM AND METHOD FOR PERFORMING BACKUP OPERATIONS USING A FIBRE CHANNEL FABRIC IN A MULTI-COMPUTER ENVIRONMENT

(75) Inventors: Karl D. Schubert, Austin, TX (US); Stephen G. Luning, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/491,578

(22) Filed: Jan. 25, 2000

(51) Int. Cl.[7] .............................................. G06F 12/00
(52) U.S. Cl. ...................................... 711/111; 709/250
(58) Field of Search ................................ 709/238, 250; 711/111, 162

(56) References Cited

U.S. PATENT DOCUMENTS

| 5,432,735 A | 7/1995 | Parks et al. .................. 365/168 |
| 5,619,728 A | 4/1997 | Jones et al. .................... 710/27 |
| 5,657,445 A | 8/1997 | Pearce ......................... 713/200 |
| 5,692,219 A | 11/1997 | Chan et al. .................... 710/49 |
| 5,694,615 A | 12/1997 | Thapar et al. ................... 710/2 |
| 5,727,218 A | 3/1998 | Hotchkin ..................... 710/260 |
| 5,761,424 A | 6/1998 | Adams et al. ................ 709/217 |
| 5,812,754 A | 9/1998 | Lui et al. ....................... 714/6 |
| 5,931,958 A | 8/1999 | Bouvier ........................ 714/48 |
| 5,978,860 A | 11/1999 | Chan et al. ..................... 710/8 |
| 5,987,506 A | 11/1999 | Carter et al. ................. 709/213 |
| 5,996,014 A | 11/1999 | Uchihori et al. ............. 709/226 |
| 5,996,075 A | 11/1999 | Matena ........................ 713/200 |
| 6,029,237 A | 2/2000 | Beelitz ........................ 711/173 |
| 6,032,239 A | 2/2000 | Beelitz ........................ 711/173 |
| 6,041,395 A | 3/2000 | Beelitz ........................ 711/173 |
| 6,078,979 A | 6/2000 | Li et al. ...................... 710/129 |
| 6,098,146 A | 8/2000 | Bouvier et al. ............. 711/100 |
| 6,279,093 B1 | 8/2001 | Beelitz ........................ 711/173 |
| 6,298,427 B1 | 10/2001 | Beelitz ........................ 711/173 |

FOREIGN PATENT DOCUMENTS

| EP | 0 858 036 A2 | 4/1998 | ........... G06F/13/42 |
| EP | 0 881 560 A2 | 5/1998 | ............. G06F/1/00 |
| WO | WO 99/34297 | 12/1998 | ........... G06F/13/00 |

OTHER PUBLICATIONS

Julie Neubauer and Glen Sando, StorageTek and Veritas: A Tape Backup Solution, Nov., 1999.*
StorageTek: StorageNet (from www.storagetek.com, file StNet8001.pdf), Jun. 1998.*

(List continued on next page.)

Primary Examiner—David Robertson
(74) Attorney, Agent, or Firm—Baker Botts L.L.P.

(57) ABSTRACT

A system and method for shared storage in a computer networking environment are provided. The system includes a fabric and a server coupled to the fabric. The server is operable to be coupled to a computer network and receive data from the network. The system further includes a physical storage device coupled to the fabric. The physical storage device is operable to store data received from the network. The system further includes a bridge coupled to the fabric and a dedicated backup storage device coupled to the bridge. The dedicated backup storage device is operable to store data received from the physical storage device.

23 Claims, 2 Drawing Sheets

OTHER PUBLICATIONS

UltraNet Product Family: Optimize Your Information With CNT (from www.cnt.com, file pl296.pdf), 1997.*

U.S. Pending patent application Ser. No. 09/330,725 entitled "Method and System for Establishing a Storage Area Network Configuration" by Ahmad Hassan Tawil; Dell USA, L.P., filed Jun. 11, 1999.

White Paper entitled "Consolidating Data Storage for Multiple Microsoft® Windows NT® Servers" by Janet Berlind; Dell Computer Corporation; Mar. 1999; <http://www.dell.com/r&d/highlights/spring99/storage.htm>.

White Paper entitled "Storage Area Network (SAN) Solutions" Feb. 1999, Dell Computer Corporation.

White Paper entitled "Designing Fibre Channel Fabrics for Storage Area Networks", by Tom Kocis and Jim Marrone; Dell Computer Corporation; Apr. 1999; <http://dell.com/r&d/wp/spring99/fchannel.htm>.

White Paper entitled "Storage Area Network (SAN) Technology", Dell Computer Corporation, Advanced Technology Group Aug. 1998.

Vectors White Paper, "Fibre Channel RAID Storage Performance" by Ahmad Tawil and Tom Bates, Jul. 1999.

Vectors White Paper, "Network Attached Storage" Dell Computer Corporation, May 1999.

Patent Abstracts of Japan–application 08288333 from: http://patent.womplex.ibm.com/cgi–biu/viewpat.cmd/JP10134485A_; printed Dec. 14, 1999.

* cited by examiner

SYSTEM AND METHOD FOR PERFORMING BACKUP OPERATIONS USING A FIBRE CHANNEL FABRIC IN A MULTI-COMPUTER ENVIRONMENT

TECHNICAL FIELD

The present disclosure relates in general to the field of computer network environments, and, more particularly, to a system and method for disk and tape sharing in a multi-computer environment.

BACKGROUND

Computer networking environments such as Local Area Networks (LANs) and Wide Area Networks (WANs) allow for a multitude of users, often at remote locations, to share communication, data, and resources. Computing devices coupled together in LANs and WANs can use any one of a number of conventionally known protocols to communicate, such as Transmission Control Protocol/Internet Protocol (TCP/IP).

The demand for data storage capacity in computer networking environments increases dramatically each year. One of the reasons driving such demand is an increase in the number of data-intensive tasks conducted over networking environments. Example of such tasks include multimedia applications, data warehousing, online transaction processing, and medical imaging. Along with this need for increased storage capacity, users demand faster access to the data and the ability to share pooled data among a large number of users. In addition to these demands, many network operators desire the ability to efficiently change the amount of storage available to a network and to more efficiently provide maintenance to existing storage.

A storage area network (SAN) is a network developed to address many of the above concerns. A conventional SAN includes a collection of data storage devices (also known as a "storage pool") communicatively coupled to a plurality of hosts such as workstations and servers. The storage devices in a SAN can be co-located, which allows for easier maintenance and easier expandability of the storage pool. In the present disclosure, the term "host" and "server" are used interchangeably, with the understanding that a "server" is one type of "host."

The hosts can access the storage pool using Fibre Channel protocol, which functionality is generally well known. The Fibre Channel protocol can serve as a common physical layer to transport multiple upper layer protocols such as SCSI, IP, HIPPI, and others. In such a system, the hosts and the data storage devices are connected to a Fibre Channel "fabric."

As storage available to a computer network increases, the need for adequate backup storage also increases. Often a computer network employs the use of a dedicated backup storage device, such as a Digital Linear Tape (DLT). A DLT is a type of magnetic tape storage device originally developed by Digital Equipment Corporation (DEC) and now marketed by several companies. DLTs operate on cartridges of varying sizes ranging, for example, from 20 to over 40 GB. During backup operations, some or all of the storage devices available to the network transmit all or a portion of stored data to the DLT. Such an operation can flood the computer network with large amounts of data for a large amount of time. Additionally, in order to attempt to decrease the amount of time such an operation can last, many computer networks employ more DLTs than necessary.

SUMMARY

In accordance with teachings of the present disclosure, a system and method for disk and tape sharing in a multi-computer environment are disclosed that provide significant advantages over prior developed systems.

According to one aspect of the present disclosure, a system includes a fabric and a server coupled to the fabric. The server is operable to be coupled to a computer network and receive data from the network. The system further includes a physical storage device coupled to the fabric. The physical storage device is operable to store data received from the network on the physical storage device. The system further includes a bridge coupled to the fabric and a dedicated backup storage device coupled to the bridge. The dedicated backup storage device is operable to store data received from the physical storage device.

According to another aspect of the present disclosure a method includes receiving data from a computer network. The data is stored on a storage area network. The storage area network is coupled to the computer network, and the storage area network has a fabric separate from the computer network. The method further includes performing backup operations for the network by transferring the data through the fabric from the storage area network to a dedicated backup storage device.

It is a technical advantage of the present disclosure that it allows for the consolidation of network storage into a central location. Such consolidation reduces the resources necessary to maintain and upgrade storage available to the computer network.

It is another technical advantage that it substantially reduces the time necessary to perform backup operations. The present invention allows for backup operations to occur without using the network, meaning it increases the efficiency of the network because it substantially reduces the network traffic that accompanies backup operations.

It is an additional technical advantage that it allows for sharing of tape storage, substantially reducing the storage necessary to complete backup operations. This in turn reduces the capital expenditure necessary for creating and maintaining a computer network.

It is a further technical advantage that it allows multiple paths for computers to reach other devices on the network. This, in turn, increases the reliability of the network.

Other technical advantages should be apparent to one of ordinary skill in the art in view of the specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
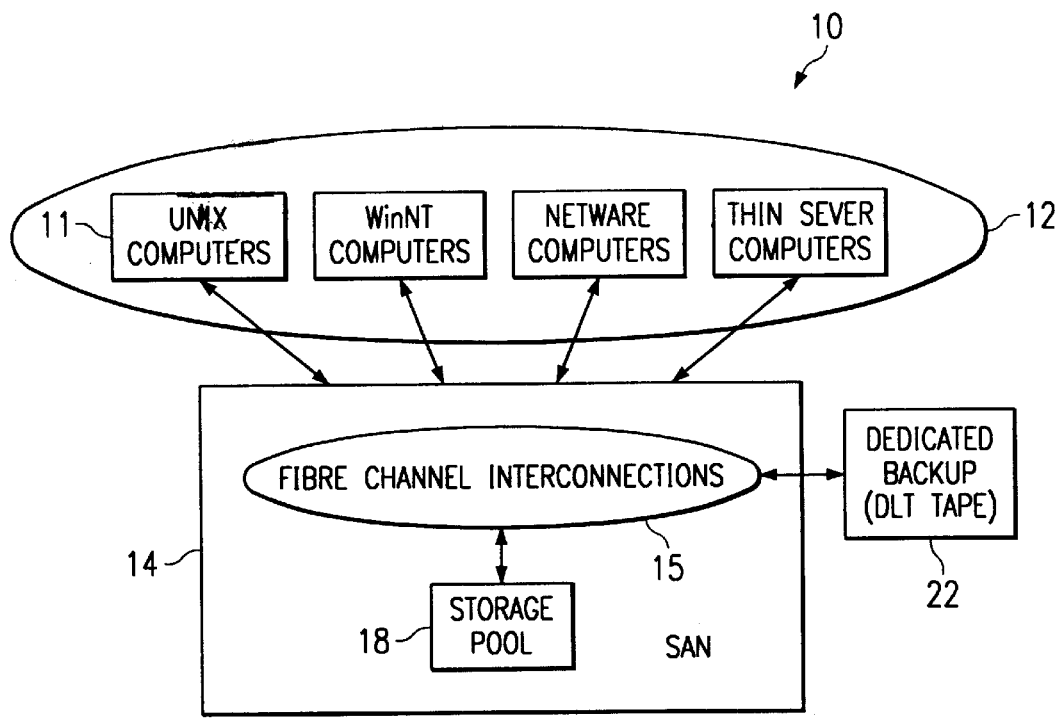
FIG. 1 is a functional block diagram of one embodiment of a computer network having shared storage.

FIG. 1 is functional block diagram of one embodiment of a computer network having shared storage. A shared storage network, indicated generally at 10, includes a plurality of clients 10 coupled into a computer network 12. For example, clients 10 can include UNIX based computers, WINDOWS NT based computers, NETWARE computers, thin server computers, and other network devices. Computer network 12 can further include, for example, a local area network (LAN), a wide area network (WAN), or other computer network allowing transmission of data between computing devices. Clients 10 can use a variety of network protocols to transfer data which are conventionally known, such as TCP/IP.

Shared storage network 10 further includes storage area network (SAN) 14 coupled to computer network 12. In the embodiment of FIG. 1, SAN 14 includes a high speed interconnection, such as Fibre Channel interconnections 15, coupled to a storage pool 18. As will be explained with respect to FIG. 2, Fibre Channel interconnections 15 can include, for example, a server coupled to computer network 12 and further coupled to a Fibre Channel fabric. Storage pool 18 can include, for example, a storage controller coupled to a plurality of physical storage devices. Such storage devices can include, for example, hard disk drives or other forms of computer readable media. As is conventionally known, such physical storage devices can be grouped into Redundant Array of Independent Disks (RAID) volumes and each volume assigned a small component system interconnect (SCSI) logical unit number (LUN) address.

Shared storage network 10 further includes a dedicated backup storage device coupled to Fibre Channel interconnections 15. Dedicated backup storage device 22 can include, for example, a computing device having removable storage such as a tape medium or other computer readable medium as is conventionally used for backup storage. For example, the dedicated backup storage device 22 can include a DLT tape library. Alternate embodiments can include more than one dedicated backup storage device 22.

In operation, clients 10 within computer network 12 can transfer data between other clients 10 as well as to/from SAN 14. SAN 14 provides a large amount of storage space, and can be the consolidated storage for computer network 12. Further in operation, dedicated backup storage device 22 can provide backup services to SAN 14. Because dedicated storage device 22 is coupled directly to SAN 14, such backup services can be performed without overloading computer network 12. When backup services are needed, SAN 14 can transfer the data directly to dedicated backup storage device 22 without transferring the data over computer network 12. This is possible because dedicated backup storage device 22 can transfer data to and from storage pool 18 through Fibre Channel connections 15.

Such an embodiment provides many advantages. SAN 14 provides consolidated storage for computer network 12, and as such provides for more convenient maintenance, or addition or deletion of storage capacity. Furthermore, the present embodiment allows for backup services to be performed without placing extra traffic on computer network 12.

Figure 2:
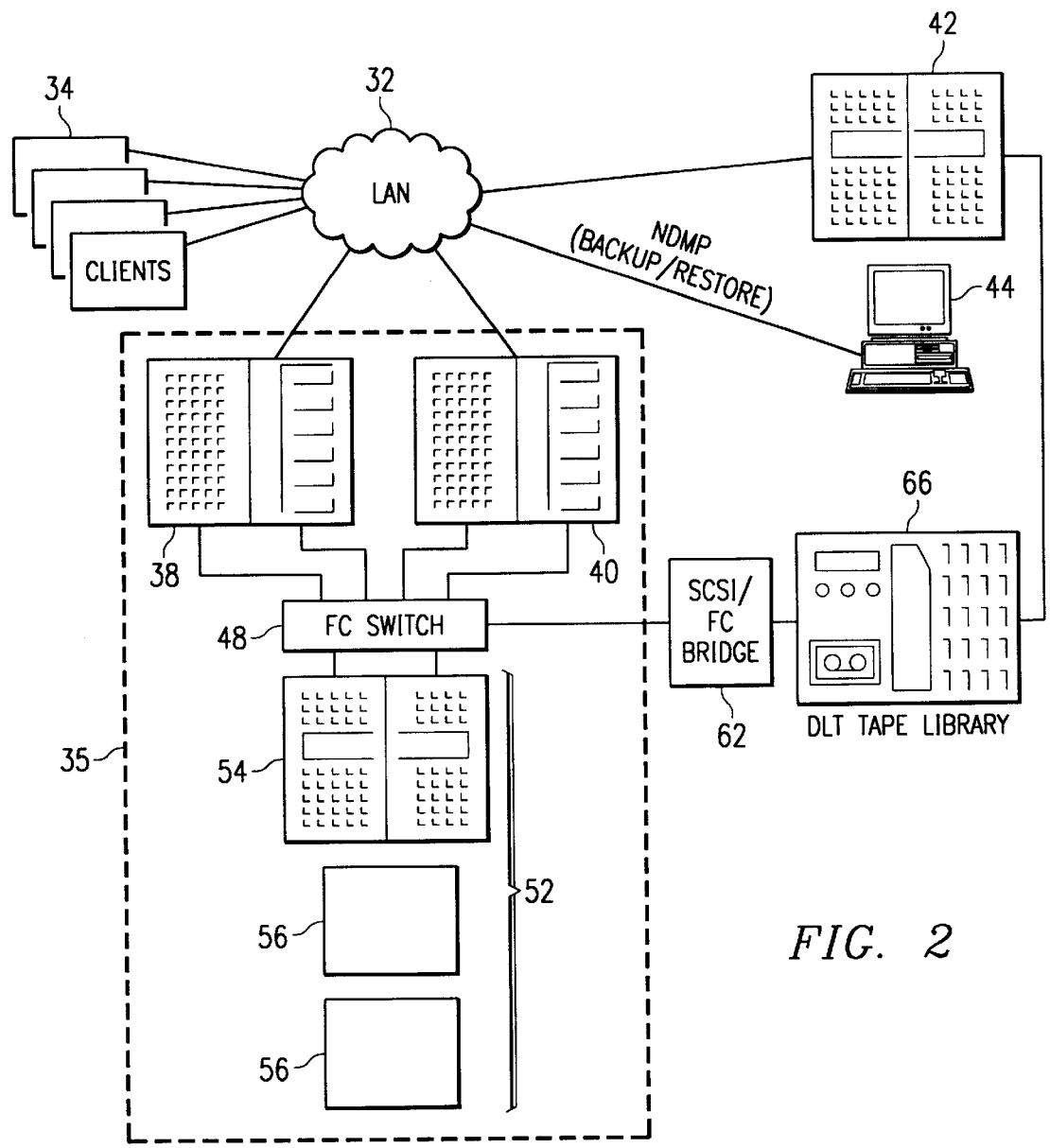
FIG. 2 is a component diagram of one embodiment of a computer network having shared storage.

FIG. 2 is a component diagram of one embodiment of a computer network having shared storage. A shared storage network, indicated generally at 30, includes a plurality of clients 34 coupled to computer network 32. For example, as shown in FIG. 1, clients 34 can include a plurality of computing devices operating under various operating systems. Computer network 32 can include, for example, a WAN, a LAN, or other type of computer network.

Shared storage network 30 further includes a SAN 35 coupled to computer network 32. In the embodiment of FIG. 2, SAN 35 includes servers 38 and 40 coupled to computer network 32. Servers 38 and 40 are coupled to a Fibre Channel switch 48. SAN 35 of FIG. 2 further includes storage pool 52 coupled to Fibre Channel 48. Storage pool 52 can include, for example, a plurality of physical storage devices and a storage controller, as is generally known. In this embodiment, storage pool 52 includes a combined controller/storage 54 and additional storage 56. For example, controller storage 54 can include a storage controller coupled to a plurality of hard disk drives and additional storage 56 can include further hard disk drives.

Shared storage network 35 further includes bridge 62 coupled to Fibre Channel switch 48. Bridge 62 can include, for example, a SCSI/FC bridge as is generally known. Such functionality can be integrated into other components, such as Fibre Channel switch 48, or performed by a separate component, such as bridge 62, as shown. Coupled to bridge 62 is a dedicated backup storage device. In the embodiment of FIG. 2, dedicated backup storage device includes DLT tape library 66. In other embodiments, there can be more than one dedicated backup storage device. An additional controller/storage 42 is coupled to computer network 32 and DLT tape library 66. Additional storage 44 is coupled to computer network 32 and controller/storage 42.

In operation, clients 34 transfer data between other clients 34 through computer network 32. Additionally, SAN 35 operates as consolidated storage for shared storage network 30. Clients 34 transfer data to and from SAN 35, and SAN 35 stores the data received from computer network 32. In the embodiment of FIG. 2, SAN 35 operates through servers 38 and 40, receiving data from computer network 32. Servers 38 and 40 use Fibre Channel protocol through Fibre Channel switch 48 to store data on storage pool 52. As is commonly known, the plurality of physical storage devices, such as hard disk drives included within storage pool 52 can be grouped into RAID volumes and assigned LUN addresses. Servers 38 and 40 can then use SCSI addressing methods to store and retrieve data from storage pool 52. As is further conventionally known, Fibre Channel protocol allows for servers 38 and 40 to be remote from storage pool 52. As can be appreciated, SAN 35 can include fewer or more servers 38 and 40, as well as fewer or more physical storage devices within storage pool 52. Additionally, SAN 35 can include further storage pools 52 coupled to additional servers.

Further in operation, servers 38 and 40 may operate in a WINDOWS NT operating system. In such a scenario, servers 38 and 40 may include a software agent such as OPEN MANAGE STORAGE CONSOLIDATION SOFTWARE by DELL COMPUTER Corporation in order to map the logical addresses of storage pool 52 to servers 38 and .40. Alternatively, a masking agent can be placed within controller/storage 54 such as is described by United States patent application entitled "Method for Storage Device Masking in a Storage Area Network and Storage Controller and Storage Subsystem for Using Such a Method" Ser. No. 09/464,843 filed by Luning, et al. on Dec. 16, 1999, whose contents are incorporated herein by reference.

Further in operation, bridge 62 couples between Fibre Channel switch 48 and tape DLT library 66, enabling the DLT tape library 66 to receive data from storage pool 52. As can be appreciated, this allows DLT tape library 66 to perform backup services on the data contained within storage pool 52. As can be further appreciated, such backup services can be accomplished without transferring data on computer network 32. This architecture provides many advantages, such as more efficient use of computer network 32, a shortened time period to perform backup services, and ability to perform backup services more often. Additionally, such an architecture allows for a fewer number of dedicated backup storage devices needed to perform such backup services.

Further in operation, additional controller/storage 42 and additional storage 44 can transfer and receive data to and from DLT tape library 66 and to and from computer network 32. Controller/storage 42 therefore allows for an alternate route to perform backup services. Additionally, it allows for an alternate route for restore services such as registering lost data to clients 34. For example, if SAN 35 becomes disabled, such alternate routes may become necessary.

Various software agents can assist in the operation of shared storage network 30 as described in FIG. 2. For example, OPENMANAGE STORAGE CONSOLIDATION SOFTWARE, by DELL COMPUTER CORPORATION may reside on servers 38 and 40 and be operable to map logical addresses of storage pool 52 to servers 38 and 40. Alternatively, as discussed above, a masking agent may reside on the storage controller of controller/storage 54. Additional software agents may include a tape backup agent such as SMARTMEDIA or NETWORKER by LEGATO resident on DLT tape library 66. Additionally, backup execution software such as LDM or BACKUP EXEC by VERITAS may reside on serves 38 and 40. A further software agent may include a backup/restore utility such as NDMP BACKUP by NETWORK APPLIANCE and LEGATO resident on storage/controller 42.

Figure 3:
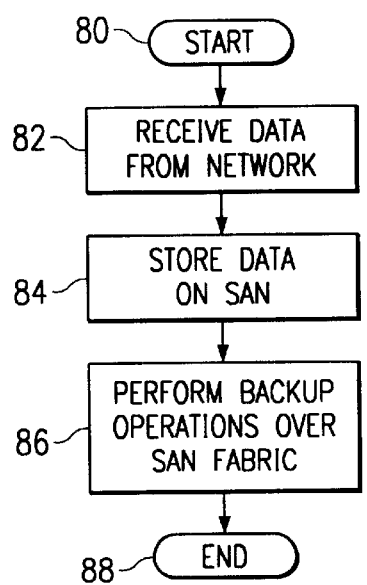
FIG. 3 is a flow diagram of one embodiment of a method for sharing storage in a computer network.

FIG. 3 is a flow diagram of one embodiment of a method for sharing storage in a computer network. Such a method can be performed, for example, by shared storage network 35 of FIG. 2. The method of FIG. 3 begins at step 80. At step 82, data is received from a computer network. As can be appreciated, such a computer network can include a LAN, WAN or other computer network. At step 84, the data is stored on a storage area network (SAN). As explained with respect to FIG. 2, such SAN can include one or more servers coupled to a Fibre Channel fabric, with one or more physical storage devices coupled to the Fibre Channel fabric for storing the data. At step 86, backup operations are performed. Such backup operations can include, for example, transferring data stored on the SAN to a dedicated backup storage medium, such as a DLT tape library. The backup operations of step 86 can be performed over the SAN fabric, and thus without transferring the data onto the computer network. Such an operation is possible because the storage area network has a fabric separate from the computer network. Therefore, the present method allows for consolidated storage of a computer network and allows for backup of such consolidated storage without the need to transfer the data to be stored over the computer network. This provides for a more efficient backup operation and all the advantages associated therewith. The method ends at step 88.

Several variations to the described embodiments are contemplated by the present disclosure. For example, DLT tape library 66 of FIG. 2 can be replaced with other types of components operable to perform data storage operations. Such other components can perform the backup operations on or offline, and may include other types of removable storage such as write-able CD ROM devices. Additionally, SAN 35 of FIG. 2, although described as operating using a Fibre Channel protocol, can also operate using another interconnection protocol. The preferred embodiment employs high speed interconnection capability. Furthermore, SAN 35 of FIG. 2 may include physical storage devices other than the described hard disk drives. For example, a future embodiment may include other types of integrated, non-volatile memory.

Although the disclosed embodiments have been described in detail, it should be understood that various changes, substitutions, and alterations can be made to the embodiments without departing from their spirited scope.

What is claimed is:

1. A system for shared storage in a computer networking environment, comprising:
   a fabric for interconnecting computing devices;
   a server coupled to the fabric, the server operable to be coupled to a computer network and receive data from the network;
   a physical storage device coupled to the fabric, the physical storage device operable to store data received from the network;
   a bridge coupled to the fabric; and
   a dedicated backup storage device coupled to the bridge and the computer network, the dedicated backup storage device operable to store data received from the physical storage device and enable access to the stored data from the computer network.

2. The system of claim 1, wherein the physical storage device comprises:
   a storage controller coupled to the fabric; and
   a plurality of physical storage devices coupled to the storage controller.

3. The system of claim 2, wherein the plurality of physical storage devices comprise a plurality of hard disk drives.

4. The system of claim 1, wherein the bridge comprises a SCSI/FC bridge.

5. The system of claim 4, wherein the dedicated backup storage device comprises a computing device having removable storage.

6. The system of claim 5, wherein the dedicated backup storage device comprises a DLT tape library.

7. The system of claim 1, wherein the fabric comprises a Fibre Channel fabric.

8. The system of claim 7, wherein the fabric comprises a Fibre Channel switch.

9. The system of claim 1, further comprising a second server coupled to the fabric, the second server operable to be coupled to the network.

10. The system of claim 1, further comprising a second physical storage device coupled to the dedicated backup storage device, the second physical storage device operable to be coupled to the network.

11. The system of claim 1, wherein the computer network comprises a Local Area Network.

12. The system of claim 1, wherein the computer network comprises a Wide Area Network.

13. The system of claim 1, wherein the server, the fabric, and the physical storage device comprises a storage area network.

14. A system for shared storage in a computer networking environment, comprising:
   a Fibre Channel switch;
   a server coupled to the Fibre Channel switch, the server operable to be coupled to a computer network and receive data from the network;
   a physical storage device coupled to the Fibre Channel switch, the physical storage device operable to store data received from the network;
   a SCSI/FC bridge coupled to the fabric; and
   a DLT tape library coupled to the SCSI/FC bridge and the computer network, the DLT tape library operable to store data received from the physical storage device and directly communicate data to at least one client coupled to the computer network.

15. The system of claim 14, wherein the physical storage device comprises:

a storage controller coupled to the fabric; and a plurality of physical storage devices coupled to the storage controller.

16. The system of claim 15, wherein the plurality of physical storage devices comprise a plurality of hard disk drives.

17. The system of claim 14, further comprising a second server coupled to the Fibre Channel switch, the second server operable to be coupled to the network.

18. The system of claim 14, further comprising a second physical storage device coupled to the dedicated backup storage device, the second physical storage device operable to be coupled to the network.

19. A system for shared storage in a computer networking environment, comprising:

a storage area network operable to be coupled to a computer network and receive data from the network;

a bridge coupled to the storage area network;

a dedicated backup storage device coupled to the bridge, the dedicated backup storage device operable to store data received from the storage area network; and the dedicated backup storage device separately coupled to the computer network and further operable to communicate with the computer network.

20. The system of claim 19, wherein the storage area network comprises:

a server;

a Fibre Channel switch coupled to the server;

a storage controller coupled to the Fibre Channel switch; and a plurality of hard disk drives coupled to the storage controller.

21. The system of claim 20, wherein the bridge comprises a SCSI/FC bridge.

22. The system of claim 21, wherein the dedicated backup storage device comprises a DLT tape library.

23. A method for sharing storage in a computer networking environment, comprising:

receiving data from a computer network;

storing the data on a storage area network, the storage area network coupled to the computer network, the storage area network having a fabric separate from the computer network;

performing backup operations for the network by transferring the data through the fabric from the storage area network to a dedicated backup storage device; and coupling the dedicated backup storage device to the computer network such that the dedicated backup storage device can send data to and receive data directly from the computer network.

* * * * *